(12) United States Patent
Ikeda et al.

(10) Patent No.: US 9,027,987 B2
(45) Date of Patent: May 12, 2015

(54) VEHICLE HOOD STRUCTURE

(75) Inventors: Koki Ikeda, Toyota (JP); Seiho Yonezawa, Miyoshi (JP); Tsuyoshi Izuhara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/116,677

(22) PCT Filed: May 18, 2011

(86) PCT No.: PCT/JP2011/061457
§ 371 (c)(1),
(2), (4) Date: Nov. 8, 2013

(87) PCT Pub. No.: WO2012/157100
PCT Pub. Date: Nov. 22, 2012

(65) Prior Publication Data
US 2014/0062142 A1    Mar. 6, 2014

(51) Int. Cl.
  B62D 25/12    (2006.01)
  B60R 21/34    (2011.01)
  B62D 25/10    (2006.01)

(52) U.S. Cl.
  CPC ............... B62D 25/12 (2013.01); B60R 21/34 (2013.01); *B60R 2021/343* (2013.01); B62D 25/105 (2013.01)

(58) Field of Classification Search
  CPC .... B62D 25/085; B62D 25/082; B62D 25/14; B60K 2001/0411; B60R 19/52; E05Y 2900/536
  USPC .......... 296/193.11, 187.04, 187.09; 180/69.2, 180/69.21, 271, 274; 280/762
  See application file for complete search history.

(56) References Cited

U.S. PATENT DOCUMENTS

| | | | |
|---|---|---|---|
| 7,150,496 B2 | 12/2006 | Fujimoto | |
| 7,810,877 B2 * | 10/2010 | Ishitobi | .................... 296/193.11 |
| 8,052,198 B2 * | 11/2011 | Seksaria et al. | .......... 296/187.04 |
| 2005/0001453 A1 | 1/2005 | Endo et al. | |

FOREIGN PATENT DOCUMENTS

| | | |
|---|---|---|
| EP | 1 493 639 A2 | 1/2005 |
| JP | A-2005-022569 | 1/2005 |
| JP | A-2005-075163 | 3/2005 |
| JP | A-2007-223414 | 9/2007 |
| JP | A-2008-110668 | 5/2008 |
| JP | A-2008-247394 | 10/2008 |

* cited by examiner

Primary Examiner — Joseph D Pape
Assistant Examiner — Dana Ivey
(74) Attorney, Agent, or Firm — Oliff PLC

(57) ABSTRACT

A hood inner panel that is provided with plural wave-shaped portions that extend in a vehicle longitudinal direction is provided at a vehicle lower side of a hood outer panel. A lock reinforcement is disposed at a lower side of a vehicle front of the hood inner panel. Front end portions of the plural wave-shaped portions of the hood inner panel are positioned further toward a vehicle front side than a rear end portion of the lock reinforcement.

5 Claims, 10 Drawing Sheets

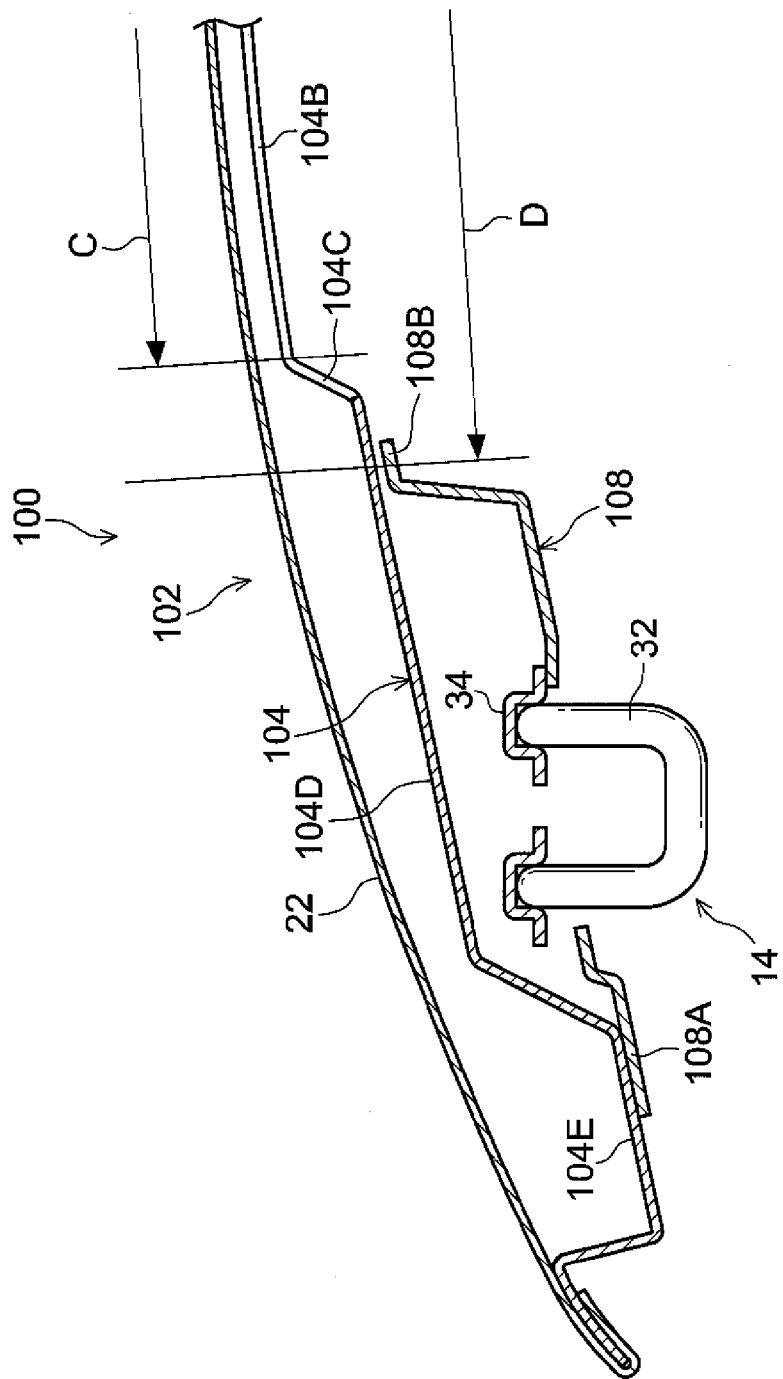

with the above-described prior art, the energy absorbing performance is improved by the wave-shaped portion of the hood inner panel. However, further improvement in the energy absorbing performance is desired.

VEHICLE HOOD STRUCTURE

TECHNICAL FIELD

The present invention relates to a vehicle hood structure.

BACKGROUND ART

Patent Document 1 (Japanese Patent Application Laid-Open No. 2008-247394) discloses a vehicle hood structure in which a distal end portion, that is wave-shaped and that is formed at a hood inner panel, is positioned at the vehicle rear side of a lock reinforcement.

[Patent Document 1] Japanese Patent Application Laid-Open No. 2008-247394

DISCLOSURE OF INVENTION

Technical Problem

In a case in accordance with the above-described prior art, the energy absorbing performance is improved by the wave-shaped portion of the hood inner panel. However, further improvement in the energy absorbing performance is desired.

In view of the above-described circumstances, an object of the present invention is to provide a vehicle hood structure that can improve the vehicle energy absorbing performance at the time of an impact.

Solution to Problem

A vehicle hood structure of a first aspect relating to the present invention is a structure that comprises: a hood outer panel that structures a hood outer plate; a lock reinforcement that is provided at a lower side of a vehicle front portion of the hood outer panel, and that supports a hood lock; and a hood inner panel whose front end portion is disposed between the hood outer panel and the lock reinforcement, and that structures a hood inner plate, a plurality of beads that respectively extend in a vehicle longitudinal direction being provided in parallel in a vehicle transverse direction at the hood inner panel, and the hood inner panel being disposed such that a front end portion of at least one of the beads is positioned further toward a vehicle front side than a rear end portion of the lock reinforcement wherein a front portion of the hood inner panel and the rear end portion of the lock reinforcement are disposed with a gap therebetween in a vertical direction.

A vehicle hood structure of a second aspect relating to the present invention is a structure in which, in the vehicle hood structure of the first aspect, the plurality of beads are structured from a plurality of wave-shaped portions.

A vehicle hood structure of a third aspect relating to the present invention is a structure in which, in the vehicle hood structure of the first aspect, the beads are provided at a plurality of frame portions that are extended along the vehicle longitudinal direction, between a plurality of opening portions that are provided in the hood inner panel.

A vehicle hood structure of a fifth aspect relating to the present invention is a structure in which, in the vehicle hood structure of the first aspect, between the front portion of the hood inner panel and the rear end portion of the lock reinforcement, a gap filling material for mitigating interference between the two is interposed.

In accordance with the vehicle hood structure of the first aspect relating to the present invention, the lock reinforcement is provided at the lower side of the vehicle front portion of the hood outer panel, and the front end portion of the hood inner panel is disposed between the hood outer panel and the lock reinforcement. Plural beads that respectively extend in the vehicle longitudinal direction are provided in parallel in the vehicle transverse direction at the hood inner panel. Moreover, due to the front end portion of at least one of the beads being positioned further toward the vehicle front side than the rear end portion of the lock reinforcement, when a collision body collides with the hood, the plural beads of the hood inner panel flex, and the flexing range of the hood inner panel at the time of impact can be enlarged. Therefore, the inertial mass increases and the inertial force increases, and due thereto, the stress propagation range widens and the energy absorbing performance improves. Further, due to deformation toward the vehicle lower side of the hood inner panel being received at the rear end portion of the lock reinforcement, the impact load can be transmitted to the lock reinforcement. Moreover, the front portion of the hood inner panel and the rear end portion of the lock reinforcement are disposed with a gap therebetween in the vertical direction. When the hood inner panel flexes toward the vehicle lower side at the time of an impact, the hood inner panel abuts the rear end portion of the lock reinforcement, and the lock reinforcement flexes integrally toward the vehicle lower side, and the impact load is thereby transmitted to the lock reinforcement. Due thereto, the energy absorbing performance can be improved even more.

In accordance with the vehicle hood structure of the second aspect relating to the present invention, the plural beads are structured from plural wave-shaped portions that are formed at the hood inner panel. Due thereto, by extending at least one of the wave-shaped portions further toward the vehicle front side than the rear end portion of the lock reinforcement, the flexing range of the hood inner panel at the time of impact can be enlarged by a simple structure.

In accordance with the vehicle hood structure of the third aspect relating to the present invention, the beads are provided at plural frame portions that are extended along the vehicle longitudinal direction, between plural opening portions of the hood inner panel. Due thereto, by extending at least one of the beads further toward the vehicle front side than the rear end portion of the lock reinforcement, the flexing range of the hood inner panel at the time of impact can be enlarged by a simple structure.

In accordance with the vehicle hood structure of the fifth aspect relating to the present invention, between the front portion of the hood inner panel and the rear end portion of the lock reinforcement, a gap filling material for mitigating interference between the two is interposed. Interference between the front portion of the hood inner panel and the rear end portion of the lock reinforcement at the time of traveling of the vehicle is mitigated, and the NV performance (noise vibration performance) can be improved.

Advantageous Effects of Invention

In accordance with the vehicle hood structure relating to the present invention, the energy absorbing performance at the time of an impact can be improved.

BRIEF DESCRIPTION OF DRAWINGS

FIG. 9 is a vertical sectional view of the vehicle hood structure along line 5-5 in FIG. 8.

BEST MODES FOR CARRYING OUT THE INVENTION

A first embodiment of a vehicle hood structure relating to the present invention is described hereinafter by using FIG. 1 through FIG. 5. Note that arrow FR shown appropriately in these drawings indicates the vehicle front side, arrow UP indicates the vehicle upper side, and arrow OUT indicates the vehicle transverse direction outer side.

Figure 1:
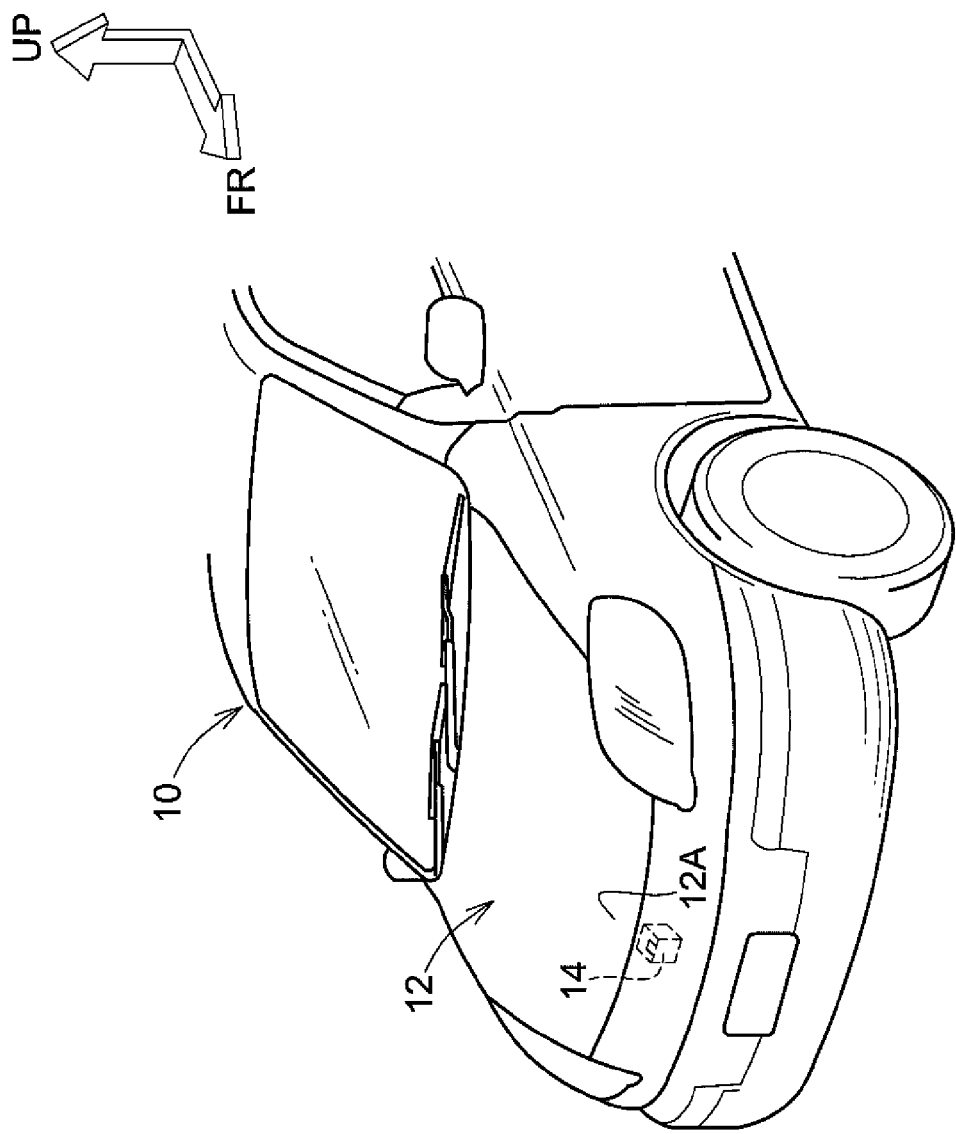
FIG. 1 is a perspective view showing a front portion of a vehicle to which a vehicle hood structure relating to a first embodiment is applied.
Figure 2:
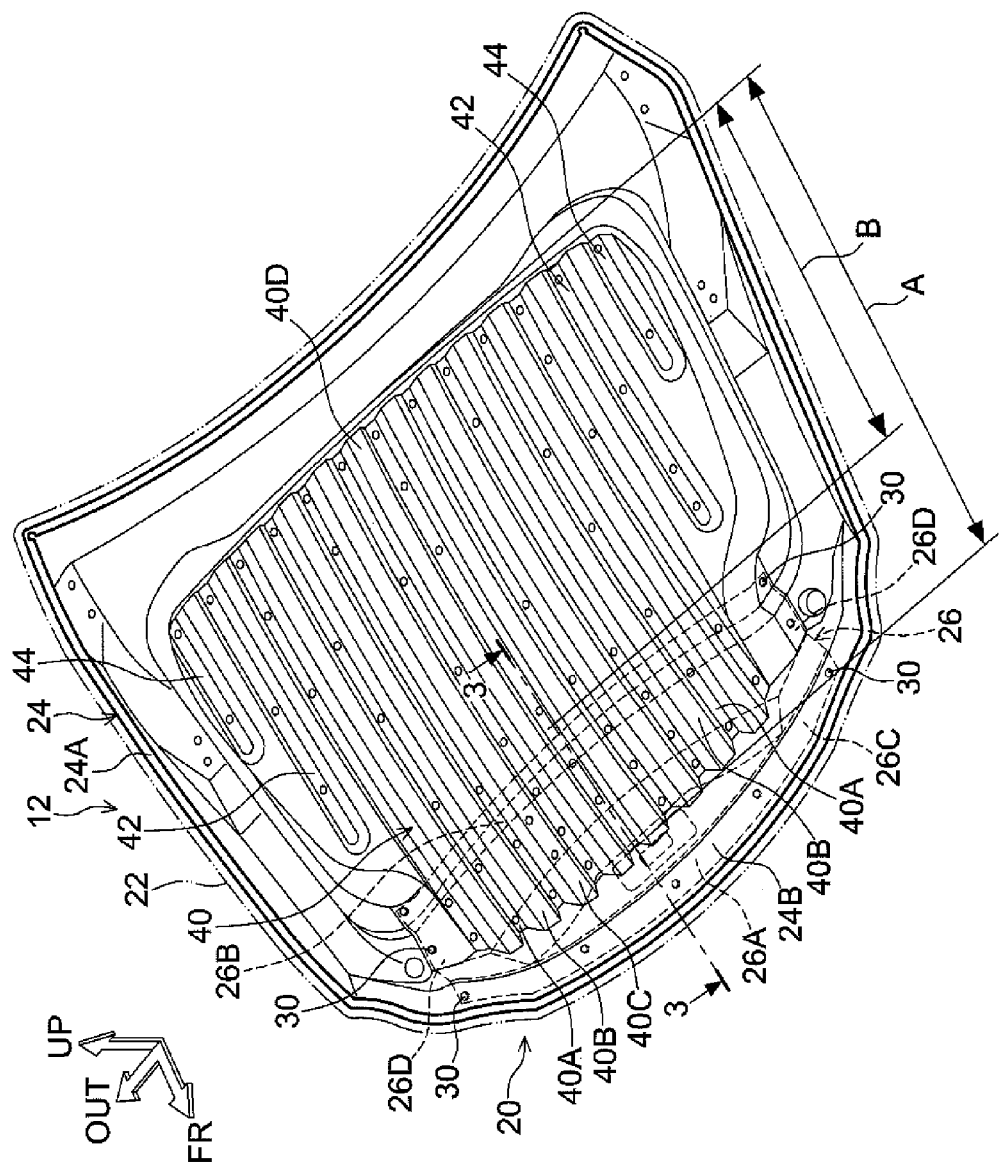
FIG. 2 is a plan view in which the vehicle hood structure relating to the first embodiment is viewed from a vehicle upper side of a hood inner panel.
Figure 3:
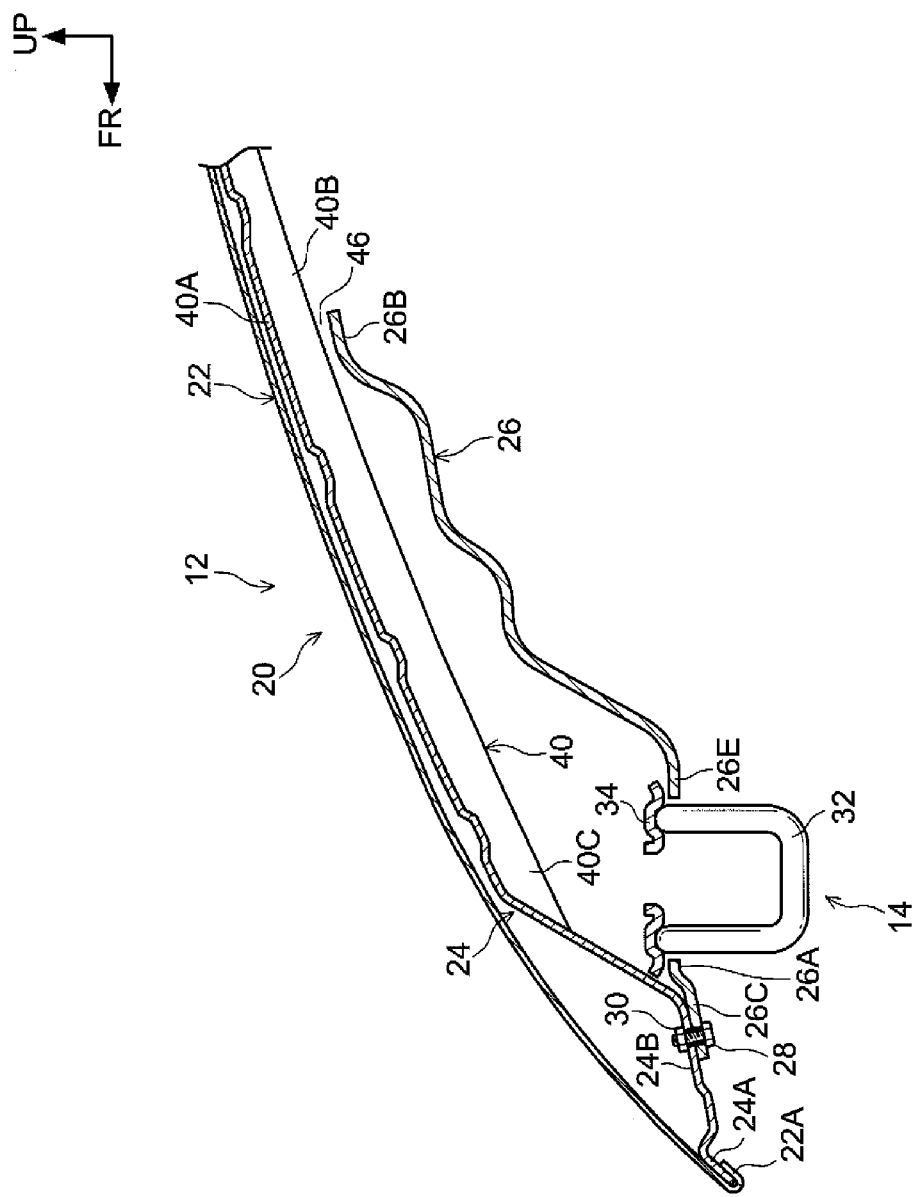
FIG. 3 is a vertical sectional view of the vehicle hood structure along line 3-3 in FIG. 2.

The front portion of a vehicle, to which the vehicle hood structure relating to the present embodiment is applied, is shown in FIG. 1. Further, the structure of the vehicle hood structure relating to the present embodiment is shown in FIG. 2 in a state of being viewed from the vehicle upper side of a hood inner panel. Further, the structure of a vicinity of a lock reinforcement of the vehicle hood structure is shown in FIG. 3 in a vertical sectional view. As shown in FIG. 1, a hood 12 is provided at the front portion of a vehicle main body of an automobile (vehicle) 10 so as to cover the region above the engine room. At the hood 12, a front end portion 12A can be opened and closed in the vehicle vertical direction with respect to the vehicle main body by a pair of left and right hinge arms (not illustrated) that are provided at the rear end portion in the vehicle longitudinal direction. A hood lock mechanism 14 is disposed at the vehicle transverse direction central portion at the front end portion 12A of the hood 12 of the vehicle main body of the automobile 10.

As shown in FIG. 2 and FIG. 3, a vehicle hood structure 20 of the present embodiment is applied to the hood 12. The hood 12 has a hood outer panel 22 that is disposed at the vehicle upper side (the vehicle outer side) along the vehicle transverse direction and the vehicle longitudinal direction, and a hood inner panel 24 that is disposed at the vehicle lower side of this hood outer panel 22 along the vehicle transverse direction and the vehicle longitudinal direction. Note that in FIG. 2, the hood outer panel 22 is illustrated by the two-dot chain lines for easy understanding of the vehicle hood structure of the present embodiment.

The hood 12 is formed as a closed cross-sectional structure due to a peripheral edge portion 24A of the hood inner panel 24 and a peripheral edge portion 22A of the hood outer panel 22 being made integral by hemming processing (see FIG. 3). Namely, the hood outer panel 22 structures the upper surface of the hood 12, and the hood inner panel 24 structures the lower surface of the hood 12, and the region between the hood outer panel 22 and the hood inner panel 24 is hollow.

Plural wave-shaped portions 40 that extend in the vehicle longitudinal direction are formed in parallel in the vehicle transverse direction in the central region, other than the vicinity of the inner side of the peripheral edge portion 24A, of the hood inner panel 24. At the plural wave-shaped portions 40, convex portions 40A, that are bent toward the vehicle upper side as seen from the vehicle front surface, and concave portions 40B, that are bent toward the vehicle lower side, are disposed alternately in the vehicle transverse direction. Namely, the plural wave-shaped portions 40 are included in the "plural beads" of the present invention. Note that the upper surfaces of the convex portions 40A of the hood inner panel 24 may be joined by an unillustrated adhesive to the lower surface of the hood outer panel 22 at predetermined places.

A lock reinforcement 26, that extends along the vehicle longitudinal direction and the vehicle transverse direction, is disposed at the vehicle lower side of the front portion of the hood inner panel 24 (see FIG. 2). In other words, the lock reinforcement 26 is disposed at the vehicle lower side of the front portion of the hood outer panel 22, and the front end portion of the hood inner panel 24 is disposed between the hood outer panel 22 and the lock reinforcement 26. As shown in FIG. 3, the lock reinforcement 26 is made into a shape in which a front end portion 26A is bent in steps toward the vehicle lower side with respect to a rear end portion 26B in the vehicle longitudinal direction. A space is formed between the hood inner panel 24 and the lock reinforcement 26 in the vehicle vertical direction.

A flange portion 26C that is substantially planar is formed at the end edge of the front end portion 26A of the lock reinforcement 26. A planar portion 24B is formed at the front end portion of the hood inner panel 24. The flange portion 26C of the lock reinforcement 26 and the planar portion 24B of the hood inner panel 24 are disposed in a planarly-contacting state, and the flange portion 26C and the planar portion 24B are fastened and fixed by bolts 28 and nuts 30 respectively. The lock reinforcement 26 is mounted to the vehicle outer side of the hood inner panel 24 by fixing the nuts 30 by welding in advance to the upper surface of the planar portion 24B of the hood inner panel 24 (the interior of the hood 12) and inserting the bolts 28 in from the vehicle outer side (the vehicle lower side) of the lock reinforcement 26 and screwing the bolts 28 together with the nuts 30.

As shown in FIG. 2, the flange portion 26C at the front end of the lock reinforcement 26 and the planar portion 24B of the hood inner panel 24 are fastened and fixed by the bolts 28 and the nuts 30 at plural places in the vehicle transverse direction (five places in the present embodiment) (see FIG. 3). Further, end portions 26D at the both vehicle transverse direction sides of the lock reinforcement 26 and planar portions, that are formed at the both vehicle transverse direction sides of the hood inner panel 24, are disposed in planarly-contacting states. The end portions 26D of the lock reinforcement 26 and the planar portions of the hood inner panel 24 are fastened and fixed by the bolts 28 and the nuts 30 at plural places in the vehicle longitudinal direction (three places in the present embodiment).

Namely, predetermined regions of three sides, that are the flange portion 26C of the front end of the lock reinforcement 26 and the end portions 26D at the both vehicle transverse direction sides, are fastened and fixed to the planar portion 24B of the front end of the hood inner panel 24 and to the planar portions at the both vehicle transverse direction sides of the hood inner panel 24. As shown in FIG. 3, there is no contact between the upper surface of the rear end portion 26B of the vehicle transverse direction intermediate portion of the lock reinforcement 26 and the lower surfaces of the plural wave-shaped portions 40 (the concave portions 40B) of the hood inner panel 24. In other words, the rear end portion 26B of the vehicle transverse direction intermediate portion of the lock reinforcement 26 and the plural wave-shaped portions 40 (the concave portions 40B) of the hood inner panel 24 are disposed with a gap 46 therebetween in the vehicle vertical direction. Note that the gap 46 in the vehicle vertical direction between the rear end portion 26B of the vehicle transverse direction intermediate portion of the lock reinforcement 26 and the plural wave-shaped portions 40 (the concave portions 40B) of the hood inner panel 24 is preferably made to be as narrow as possible within the range in which the rear end portion 26B of the lock reinforcement 26 and the plural wave-shaped portions 40 (the concave portions 40B) do not interfere with one another.

As shown in FIG. 3, a lateral wall portion 26E, that is substantially planar and that is bent toward the vehicle lower side, is formed at the front end portion 26A of the lock reinforcement 26. A striker 32, that structures a portion of the hood lock mechanism 14, is mounted to this lateral wall portion 26E. The striker 32 is a member that is substantially U-shaped and is disposed along the vehicle longitudinal direction as seen from the vehicle side surface, and hangsdown toward the vehicle main body side from an opening formed in the lateral wall portion 26E of the lock reinforcement 26, and the both end portions thereof are fixed to the lateral wall portion 26E via a base plate 34. By being anchored on a latch portion at the vehicle main body side of the hood lock mechanism 14, the striker 32 is set in a state of closing the hood 12 at the vehicle main body side. The lock reinforcement 26 needs strength in order to fix the striker 32, and is formed as a member whose plate thickness is thicker than the hood inner panel 24.

As shown in FIG. 2 and FIG. 3, front end portions 40C of the plural wave-shaped portions 40 that extend in the vehicle longitudinal direction of the hood inner panel 24 are positioned further toward the vehicle front side than the rear end portion 26B of the lock reinforcement 26. Namely, as shown in FIG. 2, a length A in the vehicle longitudinal direction of the plural wave-shaped portions 40 is formed to be longer than a length B from the rear end portion 26B of the lock reinforcement 26 to rear end portions 40D of the plural wave-shaped portions 40. The plural wave-shaped portions 40 of the hood inner panel 24 can flexurally deform toward the vehicle lower side when a collision body 80 (see FIG. 5) collides from the vehicle upper side of the hood 12. At this time, due to the front end portions 40C of the plural wave-shaped portions 40 being extended further toward the vehicle front side than the rear end portion 26B of the lock reinforcement 26, stress can be propagated over a wide range of the hood inner panel 24.

Beads 42 that extend in the vehicle longitudinal direction are formed at the both vehicle transverse direction sides of the plural wave-shaped portions 40 at the hood inner panel 24. The beads 42 are formed to be shorter than the length A in the vehicle longitudinal direction of the plural wave-shaped portions 40, and are disposed further toward the vehicle rear side than the rear end portion 26B of the lock reinforcement 26. Further, the beads 42 are disposed such that the gaps between the beads 42 and the wave-shaped portions 40 at the vehicle inner sides widen toward the vehicle rear and outer sides.

Note that, in the present embodiment, the front end portions 40C of the plural wave-shaped portions 40 that are disposed at the vehicle transverse direction intermediate portion of the hood inner panel 24 are positioned further toward the vehicle front side than the rear end portion 26B of the lock reinforcement 26. However, there may be a structure in which the front end portions 40C of some of the plural wave-shaped portions 40 are positioned further toward the vehicle front side than the rear end portion 26B of the lock reinforcement 26.

The operation and effects of the present embodiment are described next.

Figure 4A:
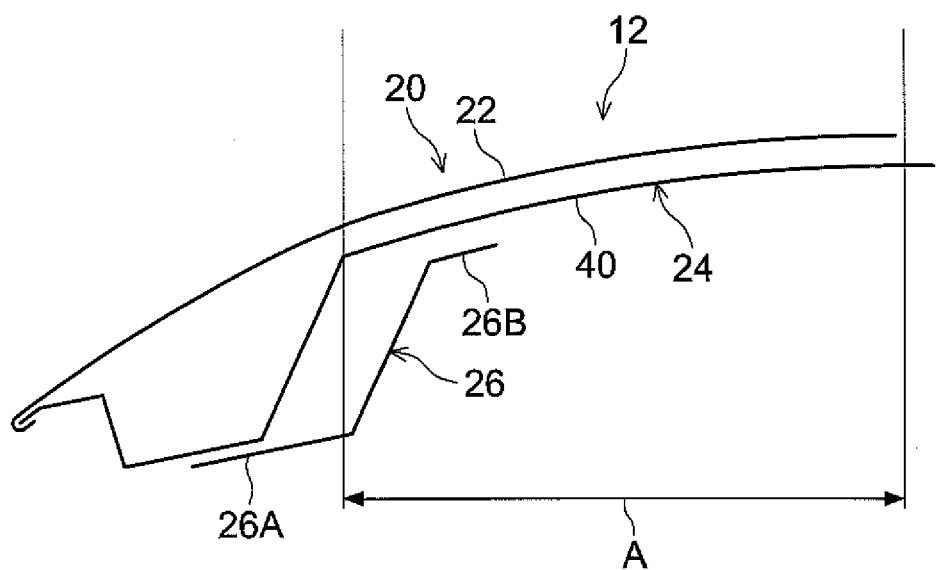
FIG. 4A is a drawing schematically showing a flexing range of a wave-shaped portion of the hood inner panel of the vehicle hood structure shown in FIG. 3.
Figure 4B:
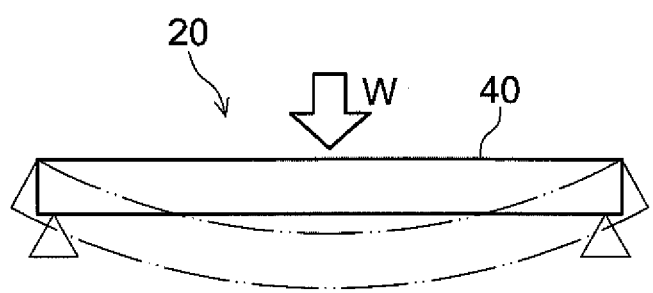
FIG. 4B is a drawing schematically showing a flexed state of the wave-shaped portion of the hood inner panel of the vehicle hood structure shown in FIG. 4A.

As shown in FIG. 3, the front end portions 40C of the plural wave-shaped portions 40, that are provided at the hood inner panel 24 and that extend in the vehicle longitudinal direction, are positioned further toward the vehicle front side than the rear end portion 26B of the lock reinforcement 26. Due thereto, as shown in FIG. 4A, the length A in the vehicle longitudinal direction of the plural wave-shaped portions 40 is long as compared with a case (refer to FIG. 9 and FIG. 10A) in which the front end portions of plural wave-shaped portions are disposed further toward the vehicle rear side than the rear end portion 26B of the lock reinforcement 26. Due thereto, as shown in FIG. 4B, when collision load W is applied, the range in which the plural wave-shaped portions 40 at the hood inner panel 24 flex is wide in the hood longitudinal direction, and stress is propagated over a wide range of the hood inner panel 24.

Figure 5:
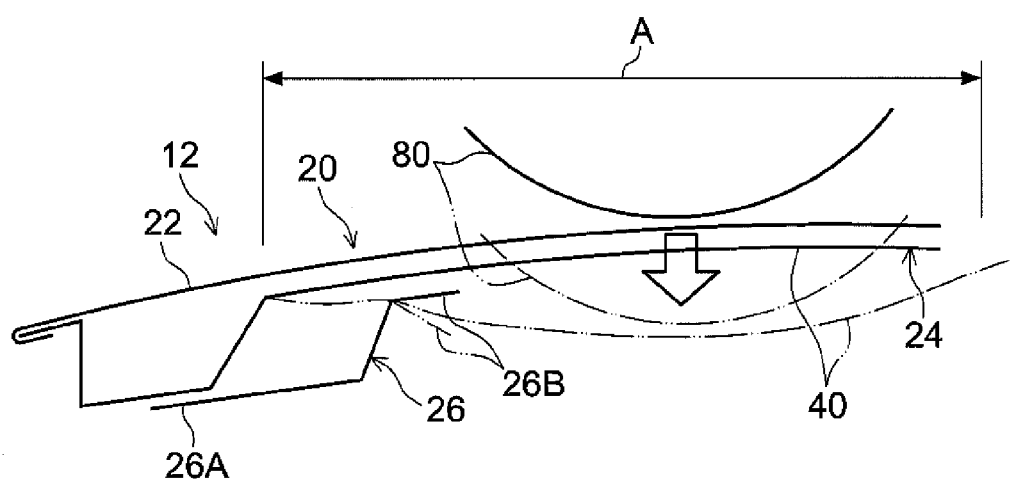
FIG. 5 is a drawing schematically showing the state of the wave-shaped portion of the hood inner panel and a lock reinforcement of the vehicle hood structure at the time when a collision body collides.

Namely, as shown in FIG. 5, when the collision body 80 collides from the vehicle upper side of the hood 12, the wide region of the plural wave-shaped portions 40 at the hood inner panel 24 flexes toward the vehicle lower side (the plural wave-shaped portions 40 greatly flex in the hood longitudinal direction), and the flexing range of the hood inner panel 24 expands. Therefore, due to the inertial mass increasing and the inertial force increasing, the stress propagation range of the hood inner panel 24 widens, and the energy absorbing performance improves.

Further, the lock reinforcement 26 is disposed at the vehicle lower side of the hood inner panel 24, and the rear end portion 26B of the lock reinforcement 26 is adjacent to the plural wave-shaped portions 40 (the concave portions 40B). Therefore, as shown in FIG. 5, due to the plural wave-shaped portions 40 at the hood inner panel 24 flexing toward the vehicle lower side, the wave-shaped portions 40 hit the rear end portion 26B of the lock reinforcement 26, and the lock reinforcement 26 also flexes integrally toward the vehicle lower side, and the load at the time of impact is transmitted to the lock reinforcement 26. Namely, due to the load at the time of impact being distributed to the lock reinforcement 26 as well, the energy absorbing performance can be improved. Due thereto, load input to the head portion of a pedestrian can be reduced, and the pedestrian protecting performance can be ensured.

Further, by disposing the rear end portion 26B of the lock reinforcement 26 and the plural wave-shaped portions 40 (the concave portions 40B) of the hood inner panel 24 with the gap 46 therebetween in the vertical direction, interference between the rear end portion 26B of the lock reinforcement 26 and the hood inner panel 24 is suppressed, and the NV performance can be improved.

A hood 100 that has a vehicle hood structure 102 relating to a comparative example is illustrated in FIG. 8 through FIG. 10B.

Figure 8:
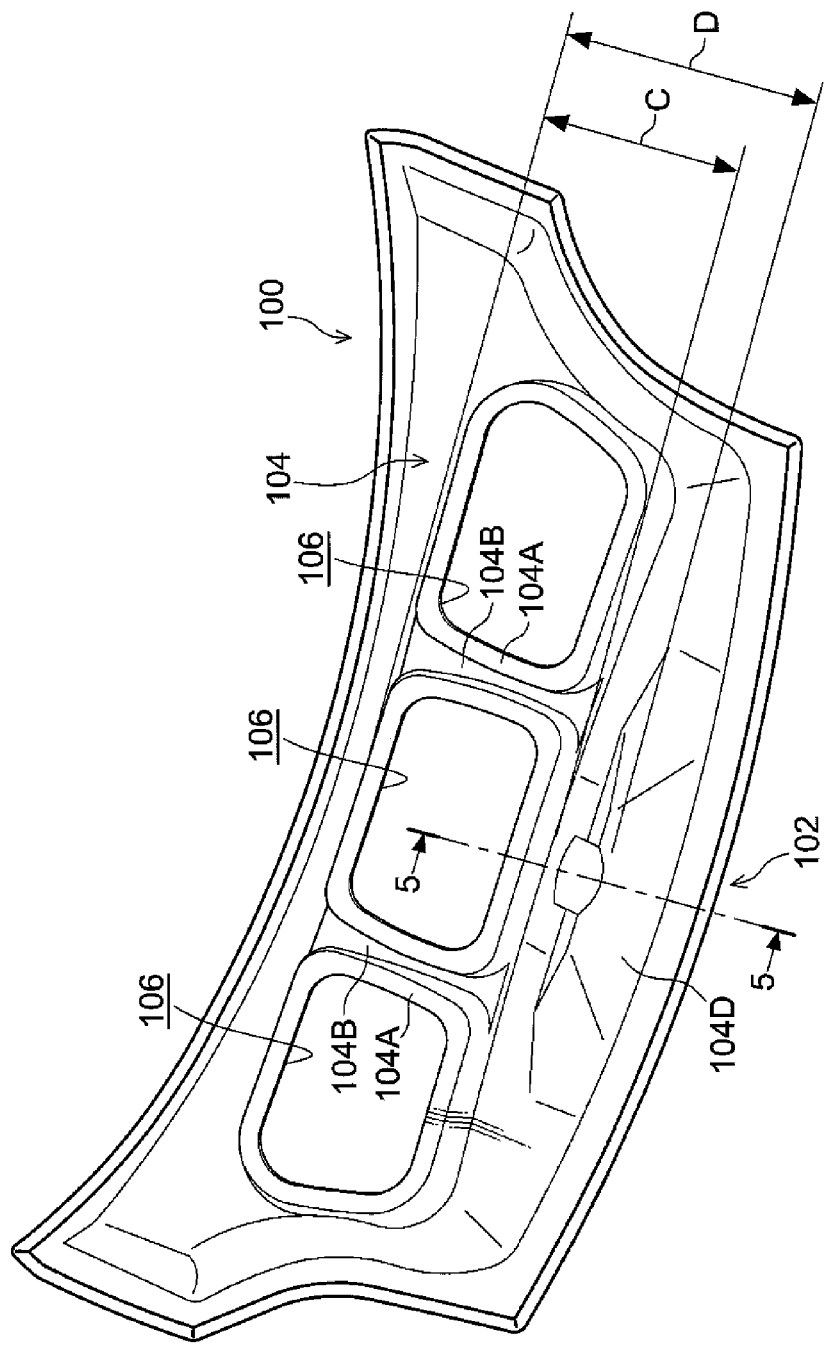
FIG. 8 is a plan view in which a vehicle hood structure relating to a comparative example is viewed from a vehicle upper side of a hood inner panel.

As shown in FIG. 8, three opening portions 106 that are substantially rectangular are formed in a hood inner panel 104 that structures the hood 100, at predetermined intervals in the vehicle transverse direction. Frame portions 104A that are extended along the vehicle longitudinal direction are provided between the adjacent opening portions 106. Beads 104B, that project-out toward the vehicle upper side as seen from the vehicle front surface, are provided at the frame portions 104A along the vehicle longitudinal direction (longitudinal direction). As shown in FIG. 9, a vertical wall portion 104C that is bent toward the vehicle lower side is formed at the vehicle front side of the bead 104B at the hood inner panel 104. A lateral wall portion (weak portion) 104D, that is extended in the vehicle longitudinal direction and the vehicle transverse direction, is formed further toward the vehicle front side than the vertical wall portion 104C.

A lock reinforcement 108 is disposed at the vehicle lower side of the lateral wall portion 104D of the hood inner panel 104. A front end portion 108A of the lock reinforcement 108 is fastened and fixed by unillustrated fasteners to a planar portion 104E that is formed at the front end portion of the hood inner panel 104 (further toward the vehicle front side than the lateral wall portion 104D). As seen from the vehicle side surface, the front end portions of the plural (two in this comparative example) beads 104B of the hood inner panel 104 are positioned further toward the vehicle rear side than a rear end portion 10813 of the lock reinforcement 108. Namely, a length C in the vehicle longitudinal direction of the plural beads 104B is formed to be shorter than a length D from the rear end portion 108B of the lock reinforcement 108 to the rear end portions of the plural beads 104B (see FIG. 8).

In this vehicle hood structure 102, as compared with the length A in the vehicle longitudinal direction of the plural wave-shaped portions 40 of the vehicle hood structure 20 of the present embodiment (see FIG. 2), the length C in the vehicle longitudinal direction of the plural beads 104B of the hood inner panel 104 is short, and the range in which the plural beads 104B flex toward the vehicle lower side is narrow.

Figure 10A:
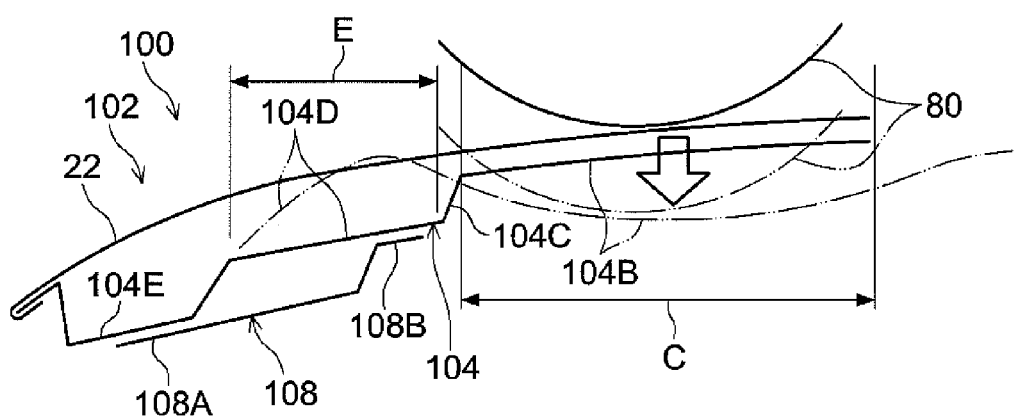
FIG. 10A is drawing schematically showing the state of a wave-shaped portion of the hood inner panel and a lock reinforcement at the time when a collision body collides, in the vehicle hood structure shown in FIG. 9.
Figure 10B:
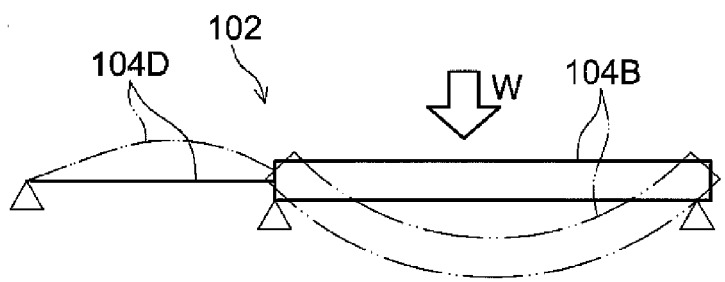
FIG. 10B is a drawing schematically showing a flexed state of the wave-shaped portion of the hood inner panel of the vehicle hood structure shown in FIG. 10A.

Namely, as shown in FIG. 10A and FIG. 10B, when the collision body 80 collides from the vehicle upper side of the hood 100, the stress propagation range of the hood inner panel 104 with respect to the impact of the collision body 80 is narrow. Further, even if the plural beads 104B of the hood inner panel 104 flex toward the vehicle lower side, the vertical wall portion 104C at the vehicle front sides of the plural beads 104B is hard and therefore does not flex, and the vertical wall portion 104C becomes a supporting point, and the beads 104B are flexed toward the vehicle lower side, and the lateral wall portion (the weak portion) 104D, that is further toward the vehicle front side than the vertical wall portion 104C, is flexed in a substantial S-shape toward the vehicle upper side. Therefore, the hood inner panel 104 does not contact the lock reinforcement 108 that is positioned further toward the vehicle lower side than the hood inner panel 104, and the impact load is not transmitted to the lock reinforcement 108.

In contrast, in the vehicle hood structure 20 of the present embodiment, as shown in FIG. 2 and FIG. 3 and the like, due to the front end portions 40C of the plural wave-shaped portions 40 at the hood inner panel 24 being extended further toward the vehicle front side than the rear end portion 26B of the lock reinforcement 26, the stress propagation range of the hood inner panel 24 is broad as compared with the vehicle hood structure 102 of the comparative example. Therefore, when the collision body 80 collides, due to stress being propagated in the wide range of the plural wave-shaped portions 40 of the hood inner panel 24, the energy absorbing performance improves. Further, in the vehicle hood structure 20 of the present embodiment, the amount of displacement toward the vehicle lower side of the hood inner panel 24 can be made to be small as compared with the amount of displacement of the hood inner panel 104 of the vehicle hood structure 102 of the comparative example, when the load W of the same magnitude is applied to the hood 12. Therefore, more energy can be absorbed by a short stroke. Moreover, due to the plural wave-shaped portions 40 of the hood inner panel 24 flexing toward the vehicle lower side and abutting the rear end portion 26B of the lock reinforcement 26, the impact load is transmitted to the lock reinforcement 26, and the energy absorbing performance can be improved even more.

A second embodiment of the vehicle hood structure relating to the present invention is described next by using FIG. 6. Note that structural portions that are the same as the above-described first embodiment are denoted by the same numbers, and description thereof is omitted.

Figure 6:
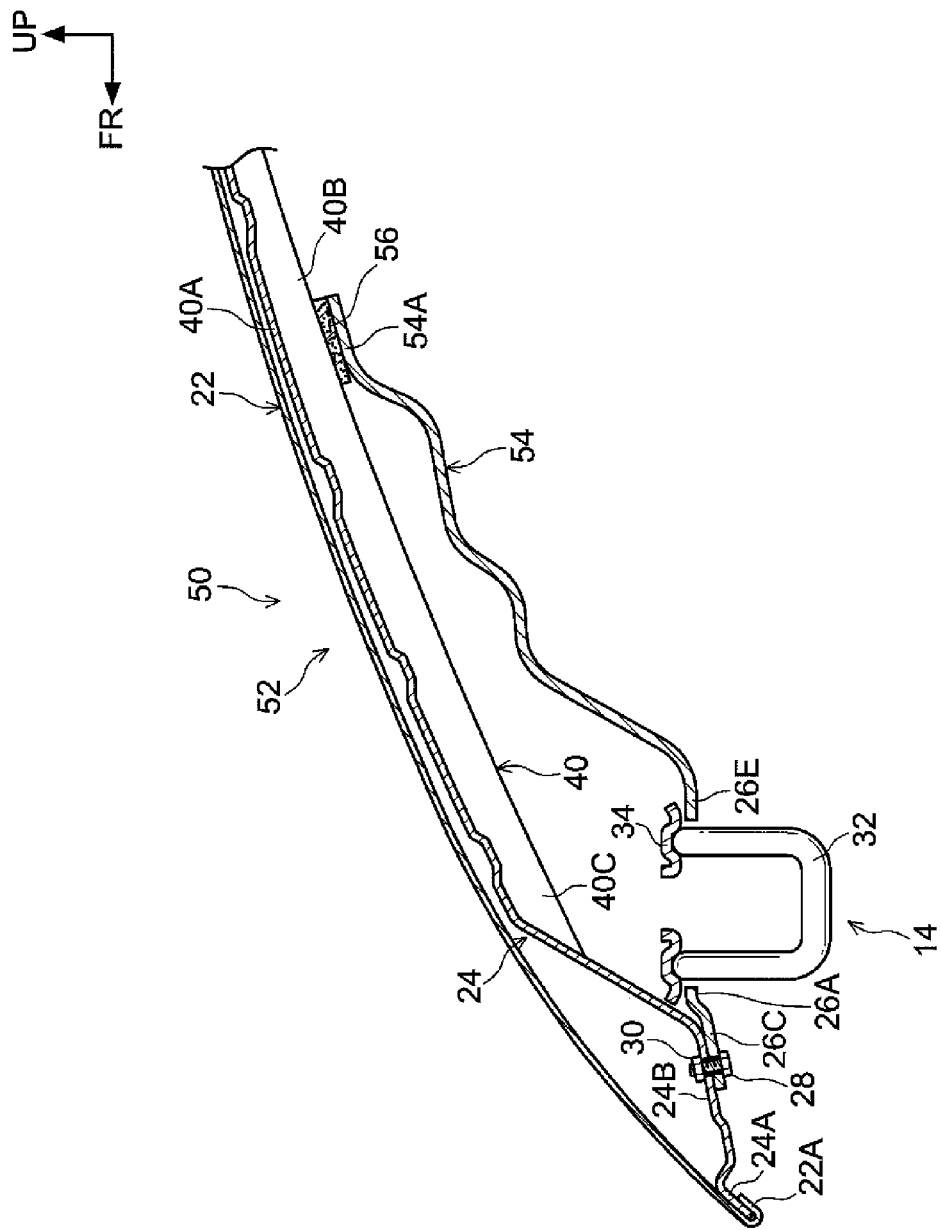
FIG. 6 is a vertical sectional view showing a vehicle hood structure relating to a second embodiment.

A hood 50, to which a vehicle hood structure 52 of the present embodiment is applied, is shown in FIG. 6. As shown in this drawing, a lock reinforcement 54 is disposed at the vehicle lower side of the hood inner panel 24 that structures the hood 50. A rear end portion 54A of the lock reinforcement 54 and the plural wave-shaped portions 40 (the concave portions 40B) that are formed at the hood inner panel 24 are disposed so as to not contact in the vertical direction.

A gap filling material 56, that is sheet-shaped and is for mitigating interference between the rear end portion 54A of the lock reinforcement 54 and the plural wave-shaped portions 40 of the hood inner panel 24, is interposed in the gap between the rear end portion 54A of the lock reinforcement 54 and the concave portions 40B of the plural wave-shaped portions 40. In the present embodiment, the gap filling material 56 is formed of a foamed resin. Note that the material of the gap filling material 56 is not limited to this, and may be an interference mitigating material formed from a non-woven fabric, fibers, or the like. The gap filling material 56 is fixed to the upper surface of the rear end portion 54A of the lock reinforcement 54 by an adhesive or the like.

In this vehicle hood structure 52, due to the gap filling material 56 that is made of a foamed resin being disposed in the gap between the rear end portion 54A of the lock reinforcement 54 and the concave portions 40B of the plural wave-shaped portions 40, interference between the rear end portion 54A of the lock reinforcement 54 and the plural wave-shaped portions 40 of the hood inner panel 24 at the time of traveling of the vehicle is mitigated, and the NV performance can be improved.

A third embodiment of the vehicle hood structure relating to the present invention is described next by using FIG. 7. Note that structural portions that are the same as the above-described first embodiment and second embodiment are denoted by the same numbers, and description thereof is omitted.

Figure 7:
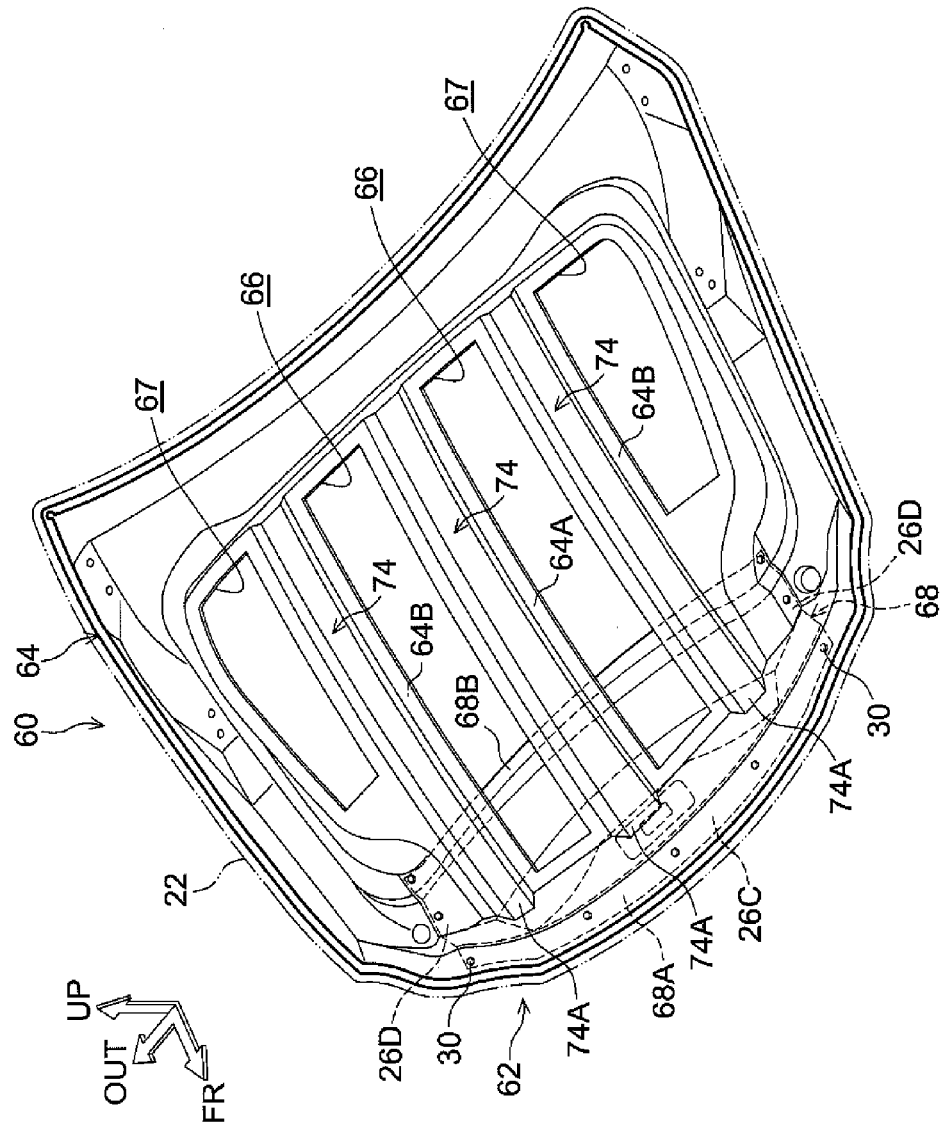
FIG. 7 is a plan view in which a vehicle hood structure relating to a third embodiment is viewed from a vehicle upper side of a hood inner panel.

A hood 60, to which a vehicle hood structure 62 of the present embodiment is applied, is shown in FIG. 7. A lock reinforcement 68 is disposed at the vehicle lower side of the front end portion of a hood inner panel 64 that structures the hood 60. Two opening portions 66, that are substantially rectangular and that are long in the vehicle longitudinal direction, are formed at a predetermined interval in the vehicle transverse direction central portion at the hood inner panel 64. Further, opening portions 67, that are substantially rectangular and whose lengths in the vehicle longitudinal direction are shorter than the opening portions 66, are formed in the hood inner panel 64 at the vehicle transverse direction both sides of the rear portions of the two opening portions 66. Frame portions 64A, 64B that extend along the vehicle longitudinal direction are provided between the adjacent opening portions 66 and between the adjacent opening portion 66 and opening portion 67.

A bead 74, that is substantially hat-shaped in cross-section and that projects-out toward the vehicle lower side as seen from the vehicle front surface, is formed along the vehicle longitudinal direction at the frame portion 64A at the vehicle transverse direction central portion of the hood inner panel 64. Similarly, the beads 74, that are substantially hat-shaped in cross-section and that project-out toward the vehicle lower side as seen from the vehicle front surface, are formed along the vehicle longitudinal direction at the frame portions 64B at the vehicle transverse direction both sides of the hood inner panel 64 and at the wall portions at the vehicle front sides thereof. Namely, the three beads 74 that respectively extend in the vehicle longitudinal direction are disposed in parallel in the vehicle transverse direction. The three beads 74 are formed such that the lengths thereof in the vehicle longitudinal direction are substantially the same, and front end portions 74A of the beads 74 are positioned further toward the vehicle front side than a rear end portion 68B of the lock reinforcement 68. A front end portion 68A of the lock reinforcement 68 is fastened and fixed to the front end portion of the hood inner panel 64. There is no contact between the upper surface of the rear end portion 68B of the lock reinforcement 68 and the lower surfaces of the beads 74 (the rear end portion 68B of the lock reinforcement 68 and the beads 74 are disposed with a gap therebetween in the vertical direction).

In this vehicle hood structure 62, by extending the front end portions 74A of the plural beads 74 at the hood inner panel 64 further toward the vehicle front side than the rear end portion 68B of the lock reinforcement 68, the range in which the plural beads 74 flex is wide and the stress propagation range of the hood inner panel 64 is wide as compared with the vehicle hood structure 102 of the comparative example (see FIG. 9 and the like). Therefore, when a collision body (not illustrated) collides from the upper side of the hood 60, the energy absorbing performance is improved due to the plural beads 74 flexing toward the vehicle lower side and stress being propagated in the wide range of the hood inner panel 64. Moreover, due to the plural beads 74 of the hood inner panel 64 flexing toward the vehicle lower side and abutting the rear end portion 68B of the lock reinforcement 68, the impact load is transmitted to the lock reinforcement 68, and the energy absorbing performance can be improved even more.

Note that the shape and the number of the plural wave-shaped portions 40 in the first embodiment and the second embodiment are not limited to the above-described embodiments, and can be changed. Further, the shape and the number of the plural beads 74 of the third embodiment are not limited to the above-described embodiment, and can be changed.

Further, in the first embodiment and the second embodiment, the front end portions 40C of the plural wave-shaped portions 40 are positioned further toward the vehicle front side than the rear end portion of the lock reinforcement, but the present invention is not limited to this. There may be a structure in which the front end portion 40C of at least one of the wave-shaped portions 40 is positioned further toward the vehicle front side than the rear end portion of the lock reinforcement.

Further, in the third embodiment, the front end portions 74A of the plural beads 74 are positioned further toward the vehicle front side than the rear end portion of the lock reinforcement, but the present invention is not limited to this. There may be a structure in which the front end portion 74A of at least one of the beads 74 is positioned further toward the vehicle front side than the rear end portion of the lock reinforcement.

Further, the plural beads of the first embodiment through the third embodiment (including the plural wave-shaped portions 40) may be shapes at which the intervals between the beads gradually widen toward the vehicle rear side (fan shapes), or, only the beads at the vehicle transverse direction outermost sides, or two to three beads including the beads at the vehicle transverse direction outermost sides, may be tilted obliquely.

The invention claimed is:

1. A vehicle hood structure comprising:
    a hood outer panel disposed at a vehicle upper side;
    a lock reinforcement that is provided at a lower side of a vehicle front portion of the hood outer panel and that supports a hood lock, the lock reinforcement comprising a rear end portion; and
    a hood inner panel disposed at a vehicle lower side below the hood outer panel, the hood inner panel comprising:
        a front portion, wherein the front portion of the hood inner panel and the rear end portion of the lock reinforcement are disposed with a gap therebetween in a vertical direction; and
        a front end portion, wherein the front end portion of the hood inner panel is disposed between the hood outer panel and the lock reinforcement;
    a plurality of beads that respectively extend in a vehicle longitudinal direction, the plurality of beads are provided in parallel in a vehicle transverse direction at the hood inner panel, wherein the hood inner panel is disposed such that a front end portion of at least one bead of the plurality of beads is positioned further toward a vehicle front side than the rear end portion of the lock reinforcement.

2. The vehicle hood structure of claim 1, wherein the plurality of beads comprise a plurality of wave-shaped portions.

3. The vehicle hood structure of claim 1, wherein a plurality of opening portions are formed at the hood inner panel along the vehicle transverse direction and a frame portion is provided to extend along the vehicle longitudinal direction between each of the adjacent opening portions, and the plurality of beads are formed at the respective frame portions.

4. The vehicle hood structure of claim 1, wherein, between the front portion of the hood inner panel and the rear end portion of the lock reinforcement, a gap filling material for mitigating interference between the front portion of the hood inner panel and the rear end portion of the lock reinforcement is interposed.

5. The vehicle hood structure of claim 1, wherein the lock reinforcement extends in the vehicle longitudinal direction and has a shape in which a front end portion is bent in steps toward the vehicle lower side with respect to a rear end portion in the vehicle longitudinal direction.

* * * * *